United States Patent Office 3,471,262
Patented Oct. 7, 1969

3,471,262
METHOD AND MEANS FOR EXACTLY SECTION-ALIZING A FLOW OF LIQUID IN A CAPILLARY TUBING
Jiri Hrdina, Prague, Czechoslovakia, assignor to Ceskoslovenska akademie ved, Prague, Czechoslovakia, a corporation of Czechoslovakia
Filed Dec. 5, 1966, Ser. No. 599,107
Claims priority, application Czechoslovakia, Dec. 3, 1965, 7,263/65
Int. Cl. G01n 33/00
U.S. Cl. 23—230                          8 Claims

ABSTRACT OF THE DISCLOSURE

In a method of sectionalizing the flow of a liquid within a capillary tubing by pistons of a dosed fluidal medium not mixable with the liquid, particularly in automatic analyzers of amino-acids and their mixtures, and in an apparatus for operating said method, the flow of the liquid through the capillary tubing is at least substantially arrested at the place where and while a piston is introduced into the liquid by synchronized pulsating delivery means in order to precisely control the length of the liquidal sections.

---

My invention relates to a method and means used in laboratory techniques particularly in automatic analyzers for exactly sectionalizing a flow of liquid within a capillary tubing.

To form in a flow of liquid passing through a capillary tubing exactly equal sections following each other in the direction of flow and separated from each other by pistons such as drops or bubbles of a fluidal medium, it is necessary not only to proportion equal volumes of said fluidal medium into the flow of liquid but also to make sure that the equally sized fluidal pistons are equally distanced from each other. This was impossible to achieve with the known methods and means in particular in view of the instability and sensitivity of the capillary phenomena in the flowing liquid.

In the known art the fluidal i.e. liquid or gaseous pistons (drops or bubbles) are pressed into the continuous flow of the liquid by continuously working pumping means. This results in great irregularities of the size and of the mutual distance of said fluidal pistons and is unacceptable for precision laboratory work.

The avoidance of said disadvantages is an object of my invention, which is primarily applicable to automatic analyzers of mixtures of amino acids. In such known analyzers and similar devices the liquid carrying substances separated from each other for example in a chromatographic column flows continuously through a capillary tubing, is mixed therein with a suitable reagent and moves through a capillary reactor in which it is exposed to an increased temperature for about fifteen minutes. According to my invention I reduce the velocity of the liquidal flow in the capillary tubing to a minimal value, advantageously to zero, at the place where and during the time while the piston forming fluidal medium is introduced into the flowing liquid.

Figure 1:
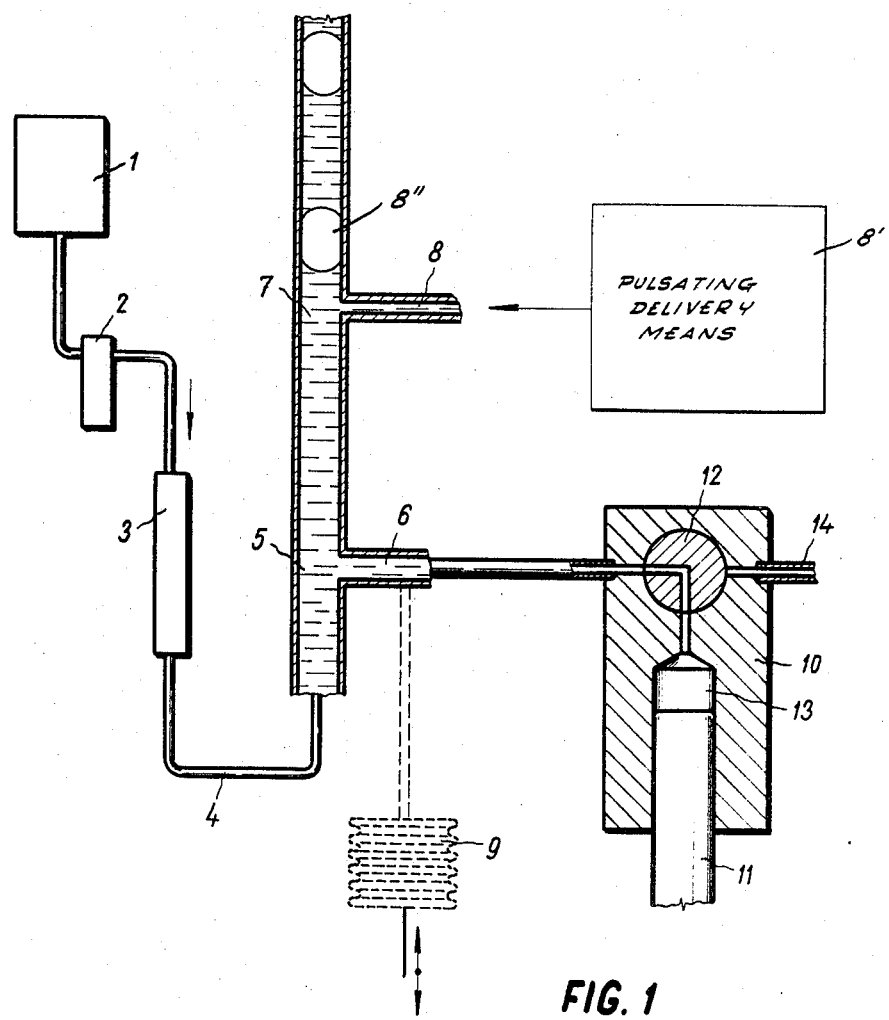
Figure 2:
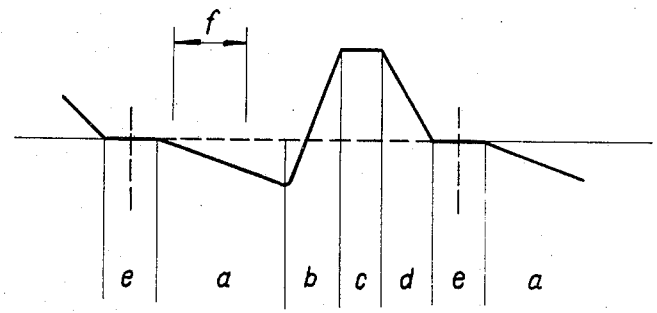
Figures 3, 4:
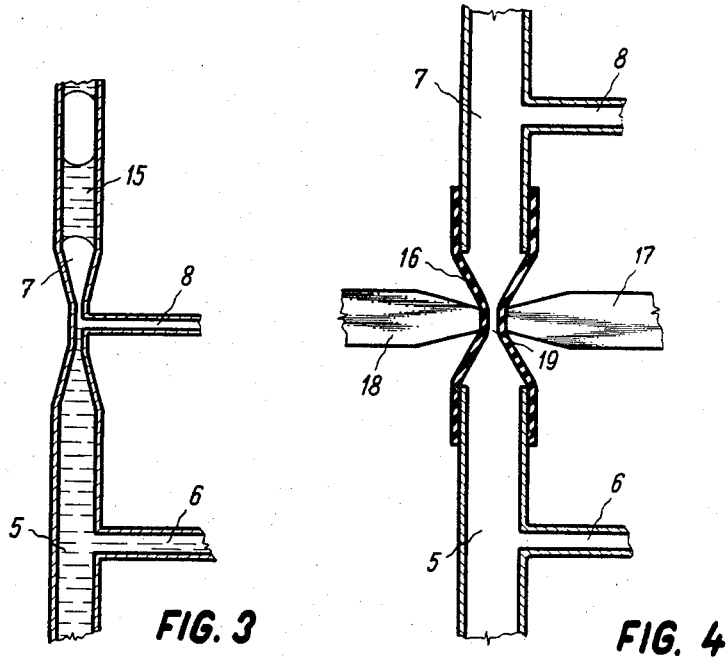

The said and other objects of my invention will be more fully understood from the following specification when read with the accompanying drawing wherein
FIG. 1 is a schematic partly sectional view of an apparatus for carrying out my invention;
FIG. 2 is a diagram explaining the working of my new method; and
FIGS. 3 and 4 show schematically two possible embodiments of the tubing for the formation of precise fluidal pistons.

The same reference characters indicate the same or equivalent elements in all figures.

As shown in FIG. 1 the eluent is drawn from tank 1 by the precision pump 2, is pulsatingly conveyed through the column 3 and from there the eluate flows substantially evenly through tubing 4 into which enters at 5 the lateral tubing 6 coming from a pressure device 9 or 10 and thereafter at 7 the lateral tubing 8 coming from pulsating delivery means. The tubing 6 carries reagent to be mixed with the eluate and the tubing 8 carries a fluidal i.e. gaseous or liquid medium which forms fluidal pistons (drops or bubbles) sectionalizing the liquid eluate moving beyond 7 through the capillary tubing 4. The medium forming the fluidal pistons is pressed through the narrow tubing 8 in precise short pulses by precisely dosing or pumping means 8'.

To achieve that the fluidal pistons be evenly sized and that they separate identically long sections of the liquid eluate, upwardly flowing through tubing 4, the velocity of said eluate in the mixing places 5 and 7 at the outlet openings of tubings 6 and 8, respectively, is greatly reduced, possibly to zero. This is achieved by volumetrically compensating means for example according to FIG. 1 by the bellows member 9 (shown in dotted lines) which communicates with the tubing 6. The bellows member 9 is periodically so operated that it retards, while expanding, the flow of the eluate at the time when the medium forming the fluidal pistons is supplied through the tubing 8. The bellows 9, as will be understood, does not act as a pumping means but is a volumetric equalizer or compensator. The same effect can be achieved by the reciprocating pump 10 comprising piston 11 and pumping chamber 13 which alternately over the angle valve 12 draws reagent through piping 14 from a not shown container and thereafter delivers it through tubing 6 into tubing 4 for mixing with the eluate at 5. The precision pump 10 with its angle valve 12 acts not only as dosing means for the reagent but also as volumetric compensator or equalizer provided the movement of the pump piston 11 is synchronized in accordance with the timing diagram shown in FIG. 2. During the period $a$ the downwardly moving piston 11 draws liquid from the mixing space 5 in tube 4 through tubing 6 into the pumping chamber 13 with the velocity existing in tube 4 while the valve 12 is in the shown position. Therefore, the liquid between the places 5 and 7 is at rest and the fluidal medium forming the separating pistons 8" is being pressed by the pulsating delivery means 8' into the at least substantially stagnant liquid during the interval $f$ thereby preventing irregularities otherwise caused by the flow of the liquid. After termination of the delivery of the fluidal pistons 8" through tubing 8 the movement of piston 11 is reversed during the period $b$ and the upwardly moving piston 11 returns through tubing 6 into the tube 4 not only the volume of liquid drawn in during the period $a$ but also presses reagent sucked in during the preceding phase $d$ of the working cycle of the pump. During the period $c$ the piston 11 is at rest in its upper position and the valve 12 is turned to connect the pumping chamber 13 with the suction line 14 carrying the reagent. In the following period $d$ reagent is drawn through tubing 14 into the pump chamber 13 by the returning piston 11. In period $e$ piston 11 remains at rest in its lower dead center position and the valve 12 is turned back to again connect the pumping chamber 13 through tubing 6 with the tubing 4, whereupon the before described cycle $a$–$b$–$c$–$d$–$e$ is repeated.

In the embodiment shown in FIG. 3 the tubing 4 at the place 7 where the piston forming fluidal medium is introduced by tubing 8 is constricted as far as possible and the following portion 15 of tubing 4 carrying the already sectionalized liquid flow may have a larger cross-sectional area still permitted to be safely closed by the fluidal pistons 8''. This will allow not only to shorten the length of tubing 15 without reducing the reaction period but will also lower the velocity of flow relative to the tubing and therefore reduce the sticking of the sections of the liquid eluate to the wall of the tubing. To form equally sized fluidal pistons 8'' such as bubbles the cross-sectional area of the tubing 4 in which the eluate is sectionalized by the separating pistons 8'' of the entering fluidal medium and that of tubing 8 carrying said fluidal medium should be as small as possible at the meeting place 7. When the piston forming medium is a gas not only the cross-sectional area of tubing 8 but also its length may be very small; this reduces possible irregularities resulting from the elasticity of the gas which is delivered in small quantities by the dosing device 8'. The tubing 4 preceding the outlet opening of tubing 8 should advantageously also be as narrow and as short as possible to reduce the mixing of portions of the not yet sectionalized flowing liquid. An enlarged cross-sectional profile 15 of the tubing 4 will also reduce the danger of any splitting of the fluidal pistons 8'' into two or more parts.

FIG. 4 illustrates another embodiment of the means to fully or substantially arrest the flow of liquid at the meeting place 7 of tubings 4 and 8. As shown the liquid carrying tubing 4 is provided with an elastic portion 16 between the meeting places 5 and 7, respectively of tubing 4 with tubings 6 and 8, respectively, which elastic portion can be cross-sectionally compressed or otherwise narrowed by governing means such as jaws 17, 18 or by other suitable means such as a rotary slide valve to reduce its passageway 19. A prerequisite for the use of this embodiment is that the tubing preceding the passageway 19 and/or its content is sufficiently elastic to prevent a dangerous rise of pressure in case of a sudden closing or narrowing of the passageway 19. The above mentioned governing means are advantageously synchronized with the working movements of the dosing means delivering reagent through tubing 6 or of the means, such as pump 2 in FIG. 1 delivering eluent into the column 3.

While specific embodiments of my invention have been shown and described to illustrate the application of the principles of my invention, it will be understood that the same may be otherwise embodied without departing from such principles.

What I claim as my invention is:

1. In the method of sectionalizing the flow of a liquid within a capillary tubing by pistons of a closed fluidal medium not mixable with said liquid, particularly in automatic analyzers of amino-acids and their mixtures, the improvement comprising at least substantially arresting the flow of the liquid at the place where and the time while a piston is introduced into the liquid in order to control the length of the liquidal sections.

2. In the method according to claim 1 the improvement comprising at least substantially withdrawing incoming liquid from the capillary tubing at a place locationally preceding the introduction of the sectionalizing piston and temporarily storing such withdrawn liquid in volumetric compensating means laterally connected to the capillary tubing to transiently and at least substantially arrest the flow of liquid at the place where and the time while the piston is introduced into the substantially stagnating liquid.

3. An apparatus for substantially evenly sectionalizing a liquid flowing through a capillary tubing by pistons of a fluidal medium not mixable with said liquid comprising in combination volumetric compensating means drawing incoming liquid from the capillary tubing and a first tubular branch connecting said means with the capillary tubing; pulsating delivery means for the said pistons and a second tubular branch leading from said means into the capillary tubing subsequent to the first tubular branch; the operation of the first and of the second tubular branch being synchronized to substantially arrest the flow of liquid at the place where and the time while a sectionalizing piston is introduced.

4. An apparatus according to claim 3 wherein the compensating means is a valve governed pumping means.

5. An apparatus according to claim 3 wherein the compensating means is a governed bellows member.

6. An apparatus according to claim 3 wherein at least a portion of the capillary tubing between the entrance of the first and the second tubular branch is elastic and reduceable in cross section to govern the velocity of the flow of liquid passing therethrough.

7. An apparatus according to claim 3 wherein the capillary tubing at the entrance of the second tubular branch is contractible.

8. An apparatus according to claim 4 comprising controllable valve means in the pumping means; a third tubular branch carrying reagent to and controlled by said valve means; the pumping means in a first step drawing incoming fluid from the capillary tubing and in following second step reagent from the third tubular branch and alternately delivering their mixture into the capillary tubing.

References Cited

UNITED STATES PATENTS 3,186,235   6/1965   Ferrari _____ 23—253 XR

MORRIS O. WOLK, Primary Examiner

R. M. REESE, Assistant Examiner

U.S. Cl. X.R.

23—253; 137—1